United States Patent [19]

Watanabe et al.

[11] Patent Number: 4,589,997

[45] Date of Patent: May 20, 1986

[54] PROCESS FOR PREPARING COLLOIDAL SOLUTION OF ANTIMONY PENTOXIDE

[75] Inventors: Yoshitane Watanabe, Tokyo; Keitaro Suzuki, Narashino; Masayuki Teranishi, Funabashi, all of Japan

[73] Assignee: Nissan Chemical Industries, Ltd., Tokyo, Japan

[21] Appl. No.: 637,408

[22] Filed: Aug. 3, 1984

[30] Foreign Application Priority Data

Aug. 16, 1983 [JP] Japan .............................. 58-149358

[51] Int. Cl.$^4$ .................. B01J 13/00; C08K 3/22; C09K 21/02
[52] U.S. Cl. ............................. 252/313.1; 106/18.28; 252/609; 252/610
[58] Field of Search .................. 252/313.1, 609, 610; 106/18.28; 564/292

[56] References Cited

U.S. PATENT DOCUMENTS

| | | | |
|---|---|---|---|
| 4,022,710 | 5/1977 | Kobashi et al. | 252/313.1 |
| 4,026,819 | 5/1977 | Langere et al. | 252/313.1 |
| 4,028,266 | 6/1977 | Langere et al. | 252/313.1 X |
| 4,341,655 | 7/1982 | Richardson | 252/313.1 |
| 4,348,301 | 9/1982 | Crompton et al. | 252/313.1 |
| 4,351,741 | 9/1982 | Vogt | 252/313.1 |

FOREIGN PATENT DOCUMENTS 460146 1/1937 United Kingdom ................ 564/292

Primary Examiner—Richard D. Lovering
Attorney, Agent, or Firm—Frishauf, Holtz, Goodman & Woodward

[57] ABSTRACT

A process for preparing an antimony pentoxide sol, which comprises dispersing sodium antimonate in water, reacting the sodium antimonate with a monovalent or divalent inorganic acid added in a stoichiometrical amount of 0.7 time to 5 times the amount of the sodium antimonate to form the sodium salt of said inorganic acid and an antimony pentoxide gel, separating and water washing said gel, dispersing said gel in water, and peptizing said gel dispersed in water by adding an organic base in an amount to provide a stoichiometrical amount of base / $Sb_2O_5$ of from 0.03 to 1.

21 Claims, 5 Drawing Figures

FIG. I
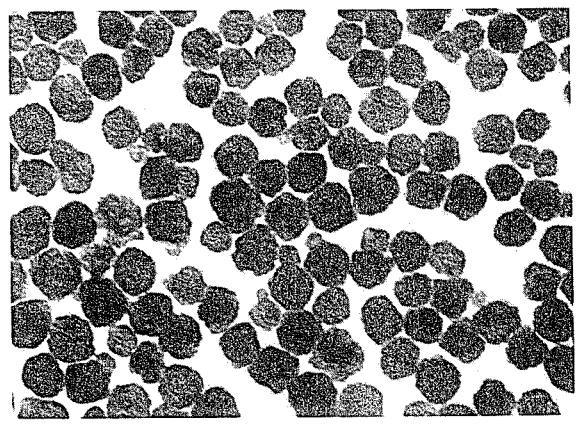
FIG. 2
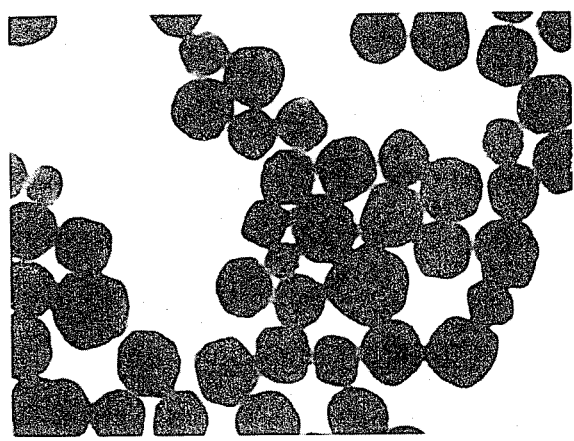

PROCESS FOR PREPARING COLLOIDAL SOLUTION OF ANTIMONY PENTOXIDE

BACKGROUND OF THE INVENTION

This invention relates to a process for preparing a colloidal solution of antimony pentoxide. More particularly, it relates to a novel process for preparing a colloidal solution of antimony pentoxide by obtaining an antimony pentoxide gel from sodium antimonate and an inorganic acid, and then peptizing the gel by use of a base.

The colloidal solution of antimony pentoxide (hereinafter referred to as "antimony pentoxide sol") is used as a flame retardant or the like for plastics, fibers, etc. Conventional processes for preparing the antimony pentoxide sol are roughly classified into an ion exchange method and a hydrogen peroxide method. As the former ion exchange method, there may be mentioned a method in which potassium antimonate is de-ionized (U.S. Pat. No. 3,860,523), or a method in which sodium antimonate is deionized (U.S. Pat. No. 4,110,247). The antimony pentoxide sols obtainable by this method have good dispersibility as they are comprised of particles almost spherical shape, and are characteristic in that they can further be made in high concentration. However, it is difficult according to this ion exchange method to effect ion exchange when the concentration of antimony pentoxide exceeds 10%. Moreover, this method has a drawback in that it requires complicated operations such that subsequent operations for separation and regeneration of ion exchange resins must be carried out. The latter hydrogen peroxide method is a method in which antimony trioxide is oxidized by use of hydrogen peroxide at a high temperature (see, U.S. Pat. No. 4,022,710; Japanese Unexamined Patent Publication No. 21298/1977; U.S. Pat. Nos. 4,028,226 and 4,026,819). This method shows high productivity because it is possible to obtain antimony pentoxide sols comprising about 30% antimony pentoxide directly, but inadvantageous in that the viscosity icreases when antimony pentoxide exceeds 30%. Moreover, this method has drawbacks that colloidal particles of the sols are irregular in shape so that there is obtained only poor dispersibility and, because of strong surface activity, poor compatibility with resin emulsions and the like.

SUMMARY OF THE INVENTION

In order to eliminate the above-mentioned drawbacks in the conventional processes for preparing antimony pentoxide sols, the present inventors have made intensive studies on the preparation of antimony pentoxide sol compositions. As a result, they have found a novel process in which the desired antimony pentoxide sol is obtained by first subjecting a starting sodium antimonate to an acid treatment under the conditions as prescribed herein to form a gel, and then peptizing the gel by use of an organic base.

According to this invention, there is provided a process for preparing an antimony pentoxide sol, which comprises dispersing sodium antimonate in water, reacting the sodium antimonate with a monovalent or divalent inorganic acid added in a stoichiometrical amount of 0.7 time to 5 times the amount of the sodium antimonate to form an antimony pentoxide gel, followed by separation and water washing of the gel, dispersing said gel in water, and peptizing the thus dispersed gel by adding an organic base in such a manner that the stoichiometrical amount of base / $Sb_2O_5$ ranges from 0.03 to 1.

BRIEF DESCRIPTION OF THE DRAWING

FIGS. 1, 2 and 3 each show an electron microscopic photograph of antimony pentoxide sol obtained in Examples 1, 3 and 6, respectively;

DESCRIPTION OF THE PREFERRED EMBODIMENTS

Figure 3:
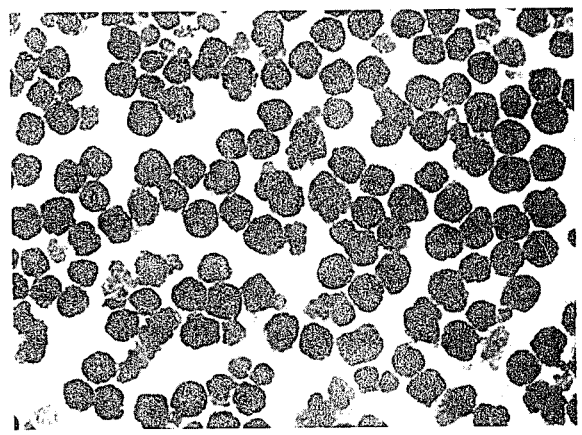
Figure 4:
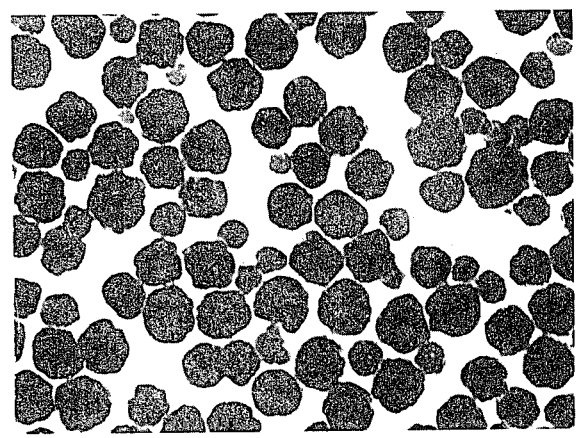
FIG. 4, a photograph of antimony pentoxide sol prepared by an ion exchange method.
Figure 5:
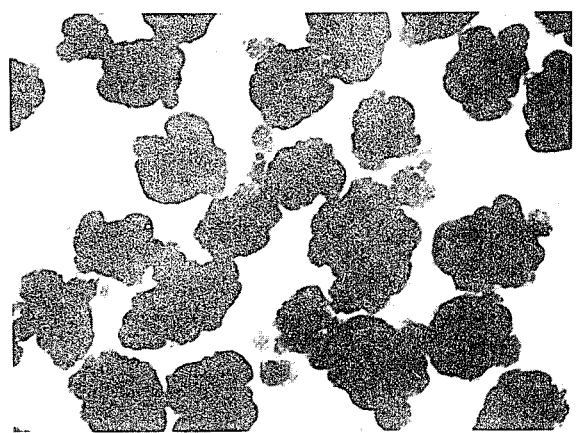
FIG. 5, by a hydrogen peroxide method. Magnification: 200,000 each.

Sodium antimonate which is a starting material used in this invention is represented by the general formula: $Na_2O.Sb_2O_3.XH_2O$, and $X=0$ to 6. Particularly preferred is a hydrate of sodium antimonate $Na_2O.Sb_2O_5.6H_2O$ ($NaSb(OH)_6$; 63 to 64% by weight of $Sb_2O_5$, 12 to 13% by weight of $Na_2O$ and 23 to 24% by weight of $H_2O$).

The acid usable in this invention for the step of forming the antimony pentoxide gel by the reaction of sodium antimonate with an acid includes monovalent or divalent inorganic acids such as hydrochloric acid, nitric acid, sulfuric acid and sulfamic acid. Phosphoric acid, which has acid strength almost equal to antimonic acid ($HSb(OH)_6$), is unsuitable for obtaining the antimony pentoxide gels. Acids of weaker acid strength, such as formic acid, oxalic acid, etc., are also unsuitable; for obtaining the desired antimony pentoxide gels.

In the reaction of sodium antimonate with the above acid in this invention, it is possible to use sodium antimonate in concentration of 2 to 35% by weight in terms of anhydrous antimony pentoxide ($Sb_2O_5$) in the reaction mixture. When the concentration is less than 2% by weight, the amount of antimony pentoxide gels produced becomes too small to be desirable from economical viewpoint. When it is in excess of 35% by weight, the solid portion in the reaction mixture reaches 50% or more and the reaction becomes heterogeneous. Preferable concentration ranges from 6 to 25% by weight as the anhydrous antimony pentoxide.

In the reaction of sodium antimonate with the above acid according to this invention, the concentration of the acid may be selected such that the stoichiometrical amount of acid / sodium antimonate ranges from 0.7 to 5, preferably, from 1 to 3. When the stoichiometrical amount is less than 0.7, it is impossible to obtain the desired antimony pentoxide gels even if reaction temperature and concentration of sodium antimonate are elevated. When it exceeds 5, the antimony pentoxide gels formed are peptized at the stage of water washing, whereby sols are washed away into a filtrate, and thus the productivity becomes inferior.

In the reaction of sodium antimonate with the above acid according to this invention, the reaction temperature may range from room temperature to 100° C., and the reaction time available may range from 1 hour to 15 hours. In order to obtain antimony pentoxide sols of good shape, it is preferred to employ a reaction temperature not higher than 50° C. and the reaction time not longer than 10 hours. When the reaction temperature is higher than 50° C. and the reaction time exceeds 15 hours, particles of the resultant antimony pentoxide sols tend to become irregular in shape.

Fine colloids of antimony pentoxide formed by the reaction of this invention are highly aggregated owing to the acid and its sodium salt present in the reaction system to form antimony pentoxide gels (usually particles of $3\mu$ or larger are formed), and immediately sedimented in the reaction mixture. Accordingly, the gel slurry thus formed can be separated very easily by a pressure (or suction) filtration method, a centrifugal filtration method or the like. After filtration, it becomes necessary to wash in order to remove coexisting acid and its sodium salt. In washing, it is possible that partial hydrolysis of antimony pentoxide is accelerated because of its contact with a large quantity of water, or that there occurs partial peptization. Therefore, in both the cases of reduced pressure filtration and centrifugal filtration, washing must be carried out immediately by pouring water in an amount of 1 time to 4 times the amount of the reaction mixture. The amount of antimony pentoxide which may be washed away into the filtrate by filtration and washing in the process of this invention is not more than 3% by weight.

The wet cake of antimony pentoxide gel obtained by the above filtration and washing has a water content of 30 to 40% by weight, and the most part thereof comprises water of crystallization. X-ray diffraction patterns of this antimony pentoxide gels are the same as those of the hydrate of antimony pentoxide ($Sb_2O_5 \cdot 4H_2O$), and X-ray diffraction patterns for the starting sodium antimonate are not observed. There can be recognized a residue of sodium in this antimony pentoxide gels, and the molar ratio of $Na_2O / Sb_2O_5$ ranges between 0.2 and 0.5.

After dispersing the wet cake of the antimony pentoxide gels in water, antimony pentoxide sols can be obtained by peptizing the gels under the conditions prescribed below.

By the way, the antimony pentoxide gels can not be peptized under the conditions prescribed below, if they have formed a dry gel.

The base usable in the step of peptizing the antimony pentoxide gels according to this invention are organic bases and include amines such as triethanolamine, tripropanolamine, diethanolamine, monoethanolamine, N-ethylaminoethanolamine, etc; quaternary ammonium hydroxides such as tetraethanolammonium hydroxide, monomethyltriethanolammonium hydroxide; and other organic bases such as quanidine hydroxide, etc. Bases such as sodium hydroxide, potassium hydroxide and ammonia are not suitable as the base since they, become incorporated into the structure of the antimony pentoxide and can only be peptized in part (see Comparative Examples). Addition of any of these organic bases is effective in that the antimony pentoxide gels formed by the reaction are peptized, and, in addition, plays an important role in that fine particles thereof are dehydrated and condensated to become colloidal particles of antimony pentoxide nearly spherical in shape and 10 to 100 m$\mu$ in size. In this invention, the peptization may be carried out at a temperature ranging from room temperature to 150° C. It is possible to carry out the peptization in an autoclave, but is not economical. It is preferred to carry out it at a temperature ranging from 50° to 100° C. The time required for completion of the peptization may vary depending on the kinds and amounts of the base and the peptization temperature, but may range from 0.5 to 20 hours.

The amount of base required for the peptization according to this invention is such that the stoichiometrical amount of base / $Sb_2O_5$ ranges from 0.03 to 1.0, preferably, from 0.07 to 0.5. When this stoichiometrical amount is less than 0.03, the peptization can not be achieved even if the peptization temperature is raised. When it exceeds 1.0, the peptization is carried out only with the PH of the sols so high that stability in storage is lowered when the resultant sols were of high concentration and, moreover, because of an excessive amount of the base, it becomes very difficult to dry the sols. According to this invention, the rate of peptization can be substantially 100%.

According to this invention, it is possible to attain the peptization concentration (herein meant by concentration of colloidal solution or sol produced by peptization) ranging from 2 to 55% by weight in terms of anhydrous antimony pentoxide ($Sb_2O_5$). When the peptization concentration is in a lower range of 2 to 30% by weight, sols may be concentrated by an evaporation method, a ultrafiltration method, a reverse osmosis method or the like, whereby sols having higher concentration of 30 to 55% by weight are readily obtained. When the concentration is less than 2% by weight, the cost for the concentration steps becomes too high for the process to be economical. When it exceeds 55% by weight, viscosity of sols becomes undesirably higher.

The peptized antimony pentoxide sols obtained by the process of this invention have a pH ranging from 4.0 to 10.5, which can be readily be adjusted to 1.5 to 4 by passing the sols through a column packed with cation exchange resins.

The process according to this invention described in the foregoing have advantageous effects as follows:

(1) Compared with the ion exchange method or the hydrogen peroxide method which are conventional processes for preparing antimony pentoxide sols, it is possible to readily obtain antimony pentoxide sols having higher concentration ranging from 30 to 55% by weight.

(2) In spite of $Sb_2O_5$ concentration of 30 to 55% by weight (specific gravity: 1.4 to 2.1), it is not necessary that the viscosity be less than 15 c.p. since the colloidal particles are substantially spherical in shape, and the stability in storage is also very good. Incidentally, the particle size is in the range of from 10 to 100 m$\mu$.

(3) Even though the concentration of $Sb_2O_5$ is as high as 30 to 55% by weight, it is possible to keep a stable pH not lower than 7 without a large increase in the viscosity, by post-addition of bases such as ammonia, sodium hydroxide, triethanolamine and quaternary ammonium hydroxide. With antimony pentoxide sols prepared by the conventional methods, it was difficult because of increase in viscosity to make the pH stable at PH not lower than 7 even if ammonia or sodium hydroxide is added, and also it is defective that the sols tend to turn pale yellow. As a characteristic property, the alkaline sols prepared by the process according to this invention are free from gelation even when mixed with emulsions of resins such as vinylidene chloride, acrylic resins, etc., and therefore have excellent compatibility.

This invention will be described below in greater detail by Examples, by which the invention is not limited, however.

In the following Examples, "%" denotes "% by weight" and sodium antimonates used have the composition of 64% $Sb_2O_5$, 12.5% $Na_2O$ and 23.5% $H_2O$.

EXAMPLE 1

600 g of sodium antimonate were dispersed in 2000 ml of water, to which added with stirring were 350 g of 35% hydrochloric acid. A mixture thus obtained was heated to 40° C. and reaction was carried out for 4 hours. In the reaction mixture, concentration of antimony pentoxide was 12.9% and the stoichiometrical amount of hydrochloric acid / sodium antimonate was 1.39. Thereafter, slurry of antimony pentoxide gel formed by the reaction was subjected to suction filtration, and then washed with water while pouring 4000 ml of water. To 625 g of a wet cake of antimony pentoxide gel (61.4% $Sb_2O_5$, 3.5% $Na_2O$, 35.1% $H_2O$; molar ratio of $Na_2O$ / $Sb_2O_5$ being 0.296) were added 300 ml of water, followed by further addition of 19 g of triethanolamine (stoichiometrical amount of amine /$Sb_2O_5$ being 0.09), which were then heated to 75° C. to carry out peptization for 5 hours. There was observed no unpeptized product remaining. Resultant sol had specific gravity of 1.616, pH of 5.78, viscosity of 9.3 c.p., 41.2% $Sb_2O_5$, 2.33% $Na_2O$, 540 ppm Cl, and particle size of 20 to 50 m$\mu$; particles were substantially spherical in shape. An electron microscopic photograph of this resultant sol is shown in FIG. 1. The above sol was stored for a month at 50° C., but there was no increase in the viscosity.

EXAMPLE 2

720 g of sodium antimonate were dispersed in 220 ml of water, to which added with stirring were 245 g of 35% hydrochloric acid. A mixture thus obtained was heated to 65° C. and reaction was carried out for 3.5 hours. In the reaction mixture, concentration of antimony pentoxide was 0.81% and the stoichiometrical amount of hydrochloric acid / sodium antimonate was 14.4. Thereafter, slurry of antimony pentoxide gel formed by the reaction was subjected to suction filtration, and then washed with water while pouring 500 ml of water. To 750 g of a wet cake of antimony pentoxide gel were added 380 ml of water, followed by further addition of 10 g of diethanolamine with stirring, which were then heated to 95° C. to carry out peptization for 6 hours. Cencentration of antimony pentoxide at the stage of peptization was 40% and stoichiometrical amount of amine / $Sb_2O_5$ was 0.071.

Resultant sol had specific gravity of 1.606, pH of 6.4, viscosity of 4.5 c.p., and particle size of 10 to 40 m$\mu$.

EXAMPLE 3

480 g of sodium antimonate were dispersed in 2240 ml of water, to which added with stirring were 376 g of an aqueous solution of 40% sulfuric acid. A mixture thus obtained was heated to 37° C. and reaction was carried out for 3 hours. In the reaction mixture, concentration of antimony pentoxide was 9.92%, concentration of sulfuric acid was 4.86%, and the stoichiometrical amount (chemical equivalent) of sulfuric acid / sodium antimonate was 0.812. After completion of the reaction, slurry of antimony pentoxide gel thus formed was subjected to suction filtration, and then washed with water while pouring 6000 ml of water. At these stages of filtration and washing, 2.2% of antimony pentoxide were washed away. A wet cake of antimony pentoxide gel thus obtained was in amount of 506 g, to which were added 2400 ml of water to disperse the wet cake, followed by further addition of 13 g of triethanolamine, which were then heated to 75° C. to carry out peptization for 4.5 hours with stirring. Stoichiometrical amount of triethanolamine / $Sb_2O_5$ was 0.093.

Resultant peptized sol had antimony pentoxide concentration of 10%, pH of 5.8, viscosity of 2.0 c.p.; particles were nearly spherical in shape, and also the particle distribution was small. An electron microscopic photograph of the sol obtained here is shown in FIG. 2.

This sol was concentrated to 50% concentration of antimony pentoxide by means of a rotary evaporator at a liquid temperature of 60° C. Resultant concentrated sol had specific gravity of 1.915, pH of 6.3, viscosity of 8.5 c.p., and particle size of 30 to 60 m$\mu$.

This concentrated sol was allowed to stand for a month, but there was observed no increase in the viscosity of sol. There was also observed no change in the shape and size of particles by the concentration.

Further, to 500 g of the above concentrated sol were added 15 g of NaOH (solid) with stirring to obtain sol having specific gravity of 1.926, pH of 8.3, viscosity of 18 c.p., and 48.5% of $Sb_2O_5$. Then, 10 g of the sol thus obtained were added to 100 g of an emulsion of polyvinylidene chloride, but no gelation of the sol was observed, and a homogeneous solution was obtained.

EXAMPLE 4

1440 g of sodium antimonate were dispersed in 1640 ml of water, to which added with stirring were 680 g of 35% hydrochloric acid. A mixture thus obtained was heated to 50° C. and reaction was carried out for 3.5 hours. In the reaction mixture, concentration of antimony pentoxide was 24.5%, concentration of hydrochloric acid was 6.5%, and the stoichiometrical amount of hydrochloric acid / sodium antimonate was 2.36. Thereafter, slurry of antimony pentoxide gel formed by the reaction was subjected to centrifugal filtration, and then washed with water while pouring 6000 ml of water. A wet cake of antimony pentoxide gel thus obtained was in amount of 1520 g.

To 600 g of wet cake of the resultant antimony pentoxide gel were added 100 ml of water, followed by further addition of 100 g of an aqueous solution of monoethyltriethanolammonium hydroxide (35% as $NR_4OH$) with stirring, which were then heated to 50° C. for 1.5 hours to carry out the peptization. Stoichiometrical amount of quaternary ammonium hydroxide / $Sb_2O_5$ was 0.19. Resultant sol had specific gravity of 1.80, pH of 9.6, viscosity of 14 c.p., 47% of $Sb_2O_5$, and particle size of 10 to 40 m$\mu$.

EXAMPLE 5

480 g of sodium antimonate were dispersed in 2320 ml of water, to which added were 330 g of 60% conc. nitric acid with stirring. A mixture thus obtained was heated to 35° C. and reaction was carried out for 4 hours. In the reaction mixture, concentration of antimony pentoxide was 9.7%, and the stoichiometrical amount of nitric acid / sodium antimonate was 0.80. Thereafter, slurry of antimony pentoxide gel formed by the reaction was subjected to centrifugal filtration, and then washed with water while pouring 4000 ml of water. To 550 g of wet cake of the resultant antimony pentoxide gel were added 538 ml of water, followed by further addition of 12 g of diethanolamine, which were then heated to 80° C. to carry out peptization for 4 hours with stirring. Cencentration of antimony pentoxide at the stage of peptization was 30% and stoichiometrical amount of amine / $Sb_2O_5$ was 0.12. The pH of the peptized sol was 8.4.

The peptized sol obtained was concentrated to 50% concentration of antimony pentoxide by means of an evaporator and at 80° C. Resultant concentrated sol had specific gravity of 1.89, pH of 9.2, viscosity of 12.5 c.p., and particle size of 20 to 50 mμ.

EXAMPLE 6

250 g of sodium antimonate were dispersed in 1550 ml of water, to which added with stirring were 200 g of 35% hydrochloric acid. A mixture thus obtained was heated to 25° C. and reaction was carried out for 8 hours. In the reaction mixture, concentration of antimony pentoxide was 8.0%, and the stoichiometrical amount of hydrochloric acid / sodium antimonate was 1.90. After completion of the reaction, slurry of antimony pentoxide gel formed was subjected to centrifugal filtration, and then washed with water while pouring 4000 ml of water. A wet cake of antimony pentoxide gel thus obtained in amount of 260 g was then dispersed in 1730 ml of water, followed by addition of 7.6 g of triethanolamine with stirring to carry out the peptization at 80° C. for 6 hours. Resultant sol had antimony pentoxide concentration of 8.0%, $Na_2O$ amount of 0.53%, stoichiometrical amount of $Na_2O$ / $Sb_2O_5$ being 0.35, Cl amount of 50 ppm, pH of 5.2, and viscosity of 1.5 c.p. Also, the colloidal particles of antimony pentoxide obtained were substantially spherical in shape and had particle size of 10 to 30 mμ. An electron microscopic photograph of this sol obtained is shown in FIG. 3.

This sol was concentrated to 50% concentration of antimony pentoxide by ultrafiltration. The concentrated sol had specific gravity of 1.88, pH of 5.87, viscosity of 9.5 c.p. Further, by allowing the peptized sol to pass a cation exchange resin (Amberlite 120 B) packed in a column, obtained was acidic antimony pentoxide sol of pH 2.5. Thereafter, to 1300 g (8% $Sb_2O_5$) of this sol were added 106 g of an aqueous solution of 10% sodium hydroxide to regulate the pH, and then the sol thus treated was concentrated to 40% concentration of antimony pentoxide at 60° C. by use of an rotary evaporator. As a result, obtained was sol having specific gravity of 1.62, pH 8.6, viscosity of 25 c.p., and having good stability in storage.

EXAMPLE 7

720 g of sodium antimonate were dispersed in 823 ml of water, to which added with stirring were 300 g of 35% hydrochloric acid. A mixture thus obtained was heated to 25° C. and reaction was carried out for 4 hours. In the reaction mixture, concentration of antimony pentoxide was 25%, and the stoichiometrical amount of hydrochloric acid / sodium antimonate was 2.03. Thereafter, slurry of antimony pentoxide gel formed after completion of the reaction was subjected to centrifugal filtration, and then washed with water while pouring 4000 ml of water. Resultant 765 g of antimony pentoxide gel wet cake (60.2% $Sb_2O_5$) were dispersed in 187 ml of water, followed by addition of 88 g of triethanolamine with stirring to carry out peptization at 40° C. for 2 hours. Stoichiometrical amount of triethanolamine / $Sb_2O_5$ was 0.12.

Resultant antimony pentoxide sol had specific gravity of 1.90, pH of 8.0, viscosity of 9.5 c.p., antimony pentoxide concentration of 49.0%, and particle size of 10 to 40 mμ.

COMPARATIVE EXAMPLE 1

480 g of sodium antimonate were dispersed in 2360 ml of water, to which added were 60 g of 89% formic acid with stirring, and thereafter the mixture was heated to 75° C. and reaction was carried out for 5 hours. However, no antimony pentoxide gel was formed. In the reaction mixture, concentration of antimony pentoxide was 10.2%, concentration of formic acied was 4.75%, and stoichiometrical amount of formic acid / sodium antimonate was 1.60.

COMPARATIVE EXAMPLE 2

480 g of sodium antimonate were dispersed in 2240 ml of water, to which added were 320 g of 35% hydrochloric acid, and then reaction was carried out at 40° C. for 4 hours. After completion of the reaction, antimony pentoxide gel slurry thus formed was subjected to centrifugal filtration, followed by pouring therein of 4000 ml of water to carry out washing. Resultant 500 g of antimony pentoxide gel wet cake were then dispersed in 2515 ml of water, to which were added 60 g of 10% NaOH with stirring to carry out peptization at 90° C. for 25 hours. Rate of the peptization was about 50%.

We claim:

1. A process for preparing an antimony pentoxide sol, which comprises dispersing sodium antimonate in water, reacting the sodium antimonate with a monovalent or divalent inorganic acid added in a stoichiometrical amount of 0.7 time to 5 times the amount of the sodium antimonate to form the sodium salt of said inorganic acid and an antimony pentoxide gel, separating and water washing said gel, dispersing said gel in water, and peptizing said gel dispersed in water by adding an organic base in an amount to provide a stoichiometrical amount of base / $Sb_2O_5$ of from 0.03 to 1.

2. The process according to claim 1, wherein said sodium antimonate is a hydrate of sodium antimonate.

3. The process according to claim 1, wherein said inorganic acid is selected from the group consisting of hydrochloric acid, nitric acid, sulfuric acid and sulfamic acid.

4. The process according to claim 1, wherein the concentration of said sodium antimonate in the reaction mixture is 2 to 35% by weight as anhydrous antimony pentoxide.

5. The process according to claim 4, wherein the concentration of said sodium antimonate in the reaction mixture is 6 to 25% by weight as anhydrous antimony pentoxide.

6. The process according to claim 1, wherein the stoichiometrical amount of the acid / sodium antimonate is from 1 to 3.

7. The process according to claim 1, wherein the reaction to form said antimony pentoxide gel is carried out at a temperature ranging from a room temperature to 100° C. and for 1 hour to 15 hours.

8. The process according to claim 7, wherein the reaction to form said antimony pentoxide gel is carried out at a temperature ranging from a room temperature to 50° C. and for 1 hour to 10 hours.

9. The process according to claim 1, wherein said organic base is an amine, a quaternary ammonium hydroxide, or guanidine hydroxide.

10. The process according to claim 9, wherein said organic base is an amine selected from the group consisting of triethanolamine, tripropanolamine, diethanolamine, monoethanolamine and N-ethylaminoethanolamine.

11. The process according to claim 9, wherein said organic base is a quaternary ammonium hydroxide selected from the group consisting of tetraethanolammonium hydroxide and monomethyltriethanolammonium hydroxide.

12. The process according to claim 1, wherein said organic base is used for the peptization in a stoichiometrical amount of base / $Sb_2O_5$ of from 0.07 to 0.5.

13. The process according to claim 1, wherein the peptization is carried out at a temperature ranging from room temperature to 150° C. and for 0.5 hour to 20 hours.

14. The process according to claim 13, wherein said temperature is from 50 to 150° C.

15. The process according to claim 13, wherein the amount of antimony pentoxide gel at the stage of peptization is from 2 to 55% by weight.

16. The process according to claim 1, wherein
   said inorganic acid is selected from the group consisting of hydrochloric acid, nitric acid, sulfuric acid and sulfamic acid;
   the concentration of said sodium antimonate in the reaction mixture is 2 to 35% by weight as anhydrous antimony pentoxide;
   the stoichiometrical amount of said acid / sodium antimonate is from 1 to 3;
   the reaction to form said antimony pentoxide gel is carried out at a temperature ranging from a room temperature to 100 C and for 1 hour to 15 hours;
   said organic base is used for the peptization in a stoichiometrical amount of base / $Sb_2O_5$ of from 0.07 to 0.5; and
   the peptization is carried out at a temperature ranging from room temperature to 150 C and for 0.5 hour to 20 hours.

17. The process according to claim 16, wherein said sodium antimonate is a hydrate of sodium antimonate.

18. The process according to claim 16, wherein said organic base is an amine, a quaternary ammonium hydroxide, or quanidine hydroxide.

19. The process according to claim 18, wherein said sodium antimonate is a hydrate of sodium antimonate.

20. The process according to claim 18, wherein
   the concentration of said sodium antimonate in the reaction mixture is 6 to 25% by weight as anhydrous antimony pentoxide;
   the reaction to form said antimony pentoxide gel is carried out at a temperature ranging from a room temperature to 50 C and for 1 hour to 10 hours;
   said organic base is selected from the group consisting of triethanolamine, tripropanolamine, diethanolamine, monoethanolamine, N-ethylaminoethanolamine, tetraethanolammonium hydroxide and monomethyltriethanolammonium hydroxide;
   the peptization temperature is from 50 to 150 C; and
   the amount of antimony pentoxide gel at the stage of peptization is from 2 to 55% by weight.

21. The process according to claim 20, wherein said sodium antimonate is a hydrate of sodium antimonate.

* * * * *